United States Patent [19]
Brown

[11] Patent Number: 5,306,480
[45] Date of Patent: Apr. 26, 1994

[54] ALUMINA HYDRATES

[75] Inventor: Stephen C. Brown, Northolt, United Kingdom

[73] Assignee: Alcan International Limited, Montreal, Canada

[21] Appl. No.: 598,587

[22] Filed: Oct. 17, 1990

Related U.S. Application Data

[63] Continuation of Ser. No. 391,628, Aug. 4, 1989, abandoned, which is a continuation of Ser. No. 74,044, Jul. 16, 1987, abandoned.

[30] Foreign Application Priority Data

Jul. 16, 1986 [GB] United Kingdom ............... 8617387

[51] Int. Cl.$^5$ .......................... C01F 7/02; C04B 14/30
[52] U.S. Cl. .................................. 423/625; 106/483; 106/484; 423/629
[58] Field of Search ............... 423/625, 629; 106/483, 106/484

[56] References Cited

U.S. PATENT DOCUMENTS

| | | |
|---|---|---|
| 3,073,675 | 1/1963 | Leum et al. |
| 3,874,889 | 4/1975 | Geppert et al. ............... 106/288 B |
| 4,166,100 | 8/1979 | Vorobiev et al. ............... 423/630 |
| 4,234,559 | 10/1980 | Tschamper ............... 423/629 |
| 4,444,899 | 4/1984 | Yamada et al. ............... 423/628 |
| 4,511,542 | 4/1985 | Anjier et al. ............... 423/121 |
| 4,562,059 | 12/1985 | Asaoka et al. ............... 423/629 |
| 4,574,003 | 3/1986 | Gerk ............... 423/628 |
| 4,574,074 | 3/1986 | Cristol et al. ............... 423/124 |
| 4,582,697 | 4/1986 | Cristol et al. ............... 423/629 |
| 4,657,754 | 4/1987 | Bauer et al. ............... 423/625 |
| 4,989,794 | 2/1991 | Askew et al. ............... 241/16 |
| 5,034,360 | 7/1991 | Bartels et al. ............... 501/127 |
| 5,083,712 | 1/1992 | Askew et al. ............... 241/16 |

FOREIGN PATENT DOCUMENTS

| | | |
|---|---|---|
| 15196 | of 0000 | European Pat. Off. |
| 0118031 | 9/1984 | European Pat. Off. ............ 423/629 |
| 1467285 | 10/1964 | Fed. Rep. of Germany ...... 423/112 |
| 1572611 | 6/1969 | France . |
| 137834 | 7/1978 | German Democratic Rep. . |
| 57-149805 | 9/1982 | Japan . |
| 2120224 | 11/1983 | United Kingdom ............... 423/629 |

OTHER PUBLICATIONS

Hydral 700 Series Data Sheet Jul. 1986.
Alcoa Technical Bulletin No. 8501 Mar. 1985.
"Martinal as Flame Retardant Filler for Cables" Martinswerk.
"The Coulter Nano-Sizer", Coulter Electronic Limited Jan. 1980 pp. 14, and 17.
Handbook of Chemistry and Physics 44th Ed. The Chemical Rubber Publishing Co. Ohio, 1962 pp. 656–657.
Chemical Abstract 101(6)40597k.
Chemical Abstract 101(6)40598m.
Chemical Abstract 72(16)83294j.
Perry's Chemical Engineers' Handbook 6th Ed. McGraw-Hill Book Company N.Y. 1984 pp. 21-19—2-1-24.
BS 2782: Part 1: Method 141:1986 1504589-1984, "Method 141, Determination of Flammability by Oxygen Index".
ISO37-1977(E) "Rubber, Vulcanized—Determination of Tensile Stress-Strain Properties".
ISO34-1979(E) "Rubber, Vulcanized-Determination of Tear Strength (trouser, angle and crescent test pieces)".
Rubbercon 1987: International Rubber Conference U.K. Jun. 1987 pp. 44-45B.
Allen, "Particle Size Measurement" London, John Wiley & Sons, 1974 p. 390.
Leschonski et al., "Comminution and Air Classification" Apr. 1984 pp. 1-4.
Corrosive Effects of Combustion Products, Oct. 1987 London.

*Primary Examiner*—Melvin J. Andrews
*Attorney, Agent, or Firm*—Browdy and Neimark

[57] ABSTRACT

Alumina hydrate particles have a high surface area and low dispersity and may have a low soluble soda content. They may be made by milling a liquid suspension of alumina hydrate, subjecting the milled suspension to classification into coarse and fine fractions, recycling the coarse fraction to the mill and recycling the fine fraction to the classification stage. A narrow particle size distribution is obtained.

11 Claims, No Drawings

ALUMINA HYDRATES

This application is a continuation of co-pending parent application Ser. No. 07/391,628 filed on Aug. 4, 1989, now abandoned itself a continuation of its parent and co-pending application Ser. No. 07/074,044 filed Jul. 16, 1987, now abandoned.

This invention relates to aluminum hydroxides commonly known as ATH. Aluminum hydroxide has a variety of alternative names, its formula may be conveniently represented as $Al_2O_3 \cdot xH_2O$ where x can take values from 1.0 to 3.0 inclusive and "ATH" as used herein encompasses all aluminum hydroxides having such values of x.

Finely divided ATH is used as a "filler" in many materials such as paper, rubber and plastics compositions which find a variety of applications, including cable sheaths, conveyor belts, thermoplastics moldings, adhesives and polyvinyl chloride and rubber goods. ATH filler can improve the mechanical and electrical properties of such materials and also acts both as a fire retardant/flame suppressant and as a smoke suppressant.

ATH is generally obtained by the Bayer process for extraction of alumina from bauxite and is contaminated with soda acquired during the extraction process. Some of the soda may be removed by simple washing with water but is fond that not all the soda is removed and the residual soda has an effect on the properties of the ATH.

In many applications relatively coarse grades of ATH (having a particle size exceeding 5 microns) find use. However, there are a range of applications, notably filled elastomers, where ATH of a finely divided form is required. The prior art has evolved precipitation processes for making ATH with surface areas of about 4–12 $m^2g^{-1}$ and average particle sizes of about 2–0.5 microns. Alternative methods of producing finely divided ATH include milling in, for example, stirred media mills or jet micronisers. These prior art methods have the disadvantage that whilst desired surface area may be readily achieved, the processes give a product of wide particle size distribution which may even be bimodal. A wide particle size distribution can have deleterious effects on filled polymer mechanical properties.

According to one aspect of the invention, there are provided alumina hydrate particles having a surface area from 2 to 15 $m^2/g$, a polydispersity not exceeding 0.3 and a content of soluble soda not exceeding 0.02%.

According to another aspect of the invention, there are provided alumina hydrate particles having a surface area above 15 $m^2/g$ and a polydispersity not exceeding 0.35.

According to yet another aspect of the invention, there are provided comminuted alumina hydrate particles having a surface area of at least 2 $m^2/g$ and a polydispersity not exceeding 0.35.

The polydispersity of the particles is represented by the magnitude:

$$-\frac{1}{2}\left(\frac{\ln d - \ln d_{50n}}{\sigma}\right)^2$$

wherein $\ln$ = natural logarithm $$d = N \cdot \frac{1}{\sqrt{2\pi} \cdot \sigma d} e$$

$d_{50n}$ = number median particle size
$N$ = number of particles
$\sigma$ = width parameter, that is the log standard deviation $\dfrac{d_{84}}{d_{50}}$ of $\dfrac{d_{50}}{d_{84}}$ of The particle size.

Particles according to the second and third aspects mentioned above may have soluble soda contents not exceeding 0.02%. Particles according to all the above-mentioned aspects may have soluble soda contents not exceeding 0.01%, preferably not exceeding 0.005%.

The particles may be provided with a surface coating of a dispersing agent, such as an anionic dispersant.

The surface areas given herein are as measured by the standard Strohlein method as described in "Particle Size Measurement", p. 390, Terence allen, Chapman & Hall Ltd. 1975.

The soluble soda content is the amount of sodium (expressed as weight percent sodium oxide) that is readily extracted from the ATH by excess water. This "soda" resides on or very near the particle surfaces and is distinctly more able to adversely affect the ATH properties and those of a filled polymer than sodium entrapped within the body of the particles.

The soluble soda content is estimated by subjecting the ATH to extraction with deionized water, passing the solution obtained through a flame and measuring the intensity of the light, at a wavelength characteristic of sodium, emitted by the flame. The "polydispersity" of the ATH is a measure of the width of the particle size distribution and may be derived from particle size measurement using a laser photon correlator such as the Malvern laser photon correlator as explained below.

According to another aspect of the invention there is provided a method of making such ATH particles which comprises milling a liquid suspension of larger ATH particles in a stirred media mill, subjecting the milled suspension to continuous classification to separate the suspension into a coarse fraction of greater particle size and a fine fraction of smaller particle size, recycling the coarse fraction to the mill input and recycling the fine fraction to the continuous classification step, if required subjecting the milled suspension to ion exchange to reduce the content of the soluble soda in the particles, and subsequently drying the suspension. The liquid phase of the suspension is generally water. It may also be a non-aqueous liquid such as alcohols, toluol, xylene, ethyl acetate, butyl acetate and methyl isobutyl ketone, paraffins and phthalates.

The milling may be carried out in a mill of known type and to achieve continuous classification the milled suspension may be passed through a continuous classification device to separate it into a coarse fraction and a fine fraction, the coarse fraction being recycled to the mill input and the fine fraction being recycled to the input of the classification device. Milling is continued until the desired average particle size, giving a surface area of at least 2 $m^2/g$ and optionally greater than 15 $m^2/g$, is obtained. This milling procedure is capable of giving the desired narrow grain size distribution, that is a polydispersity lower than 0.35 and preferably lower than 0.30.

Milling is preferably carried out using a slurry of high concentration of ATH in order to improve cost efficiency and as comminution proceeds the viscosity of the slurry tends to increase. This increase in viscosity may be avoided or reduced by adding a viscosity modifier to the slurry. For an aqueous slurry appropriate viscosity modifiers are usually selected from the family of anionic polyelectrolyte dispersants commercially available, for example certain types of sodium polyacrylate. For non-aqueous slurries other types of viscosity modifier are chosen. Whilst not wishing to be limited to ay particular theory it is believed that an ionic viscosity modifier such as sodium polyacrylate ionizes in the aqueous suspension and the negatively charged ions produced are adsorbed on the surface of the fine ATH particles produced which are positively charged. The adsorbed ions tend to disperse the particles by steric hindrance and ionic repulsion, thus avoiding formation of aggregates of fine particles which tend to trap the liquid of suspension by occlusion. The concentration of viscosity modifier in the suspension may vary from 0 to 10.0% by weight on the concentration of ATH, depending on the desired viscosity of the suspension.

After milling the suspension may be treated by ion exchange to reduce its content of soda using a known ion-exchange agent such as Duolite C255H+ manufactured by Diamond Shamrock in the form of beads to exchange sodium for hydrogen ions. The ion exchange may be carried out simply by allowing the suspension to stand in contact with the ion-exchange agent, whereupon the pH value of the initially alkaline suspension decreases as the sodium ions in the suspension are adsorbed by the ion-exchange agent and replaced by hydrogen ions. An excess of ion exchange agent over the amount theoretically required may be used to accelerate the reaction and the mixture of suspension and ion exchange agent may be stirred continuously or at intervals. Typically, 10 liters of beads of ion exchange agent may be used per 100 liters of beads of suspension containing 70% weight/volume of ATH. The progress of the ion exchange treatment may be monitored by observing the pH of the suspension. The initial pH is of the order of 10 and as the sodium ions are removed the pH falls to below 7, generally to about 5.

It has been found that when sodium polyacrylate is present during the milling step and carried over to the ion-exchange step, the viscosity of the suspension during ion exchange rises to a maximum at a pH of about 7 and then falls as the pH decreases further. It is believed that during ion exchange the sodium polyacrylate is converted to a polyacrylic acid which also acts as a dispersant. Other anionic polyelectrolytes have been fond to behave in a similar manner.

The coarse ATH feed to the milling process typically has a soluble soda content of about 0.01%. During milling the soluble soda increases through release of sodium hitherto trapped within the body of the ATH particles. Sodium can also be added to the system as an impurity in the liquid component of the slurry (eg. mains water) and from the viscosity modifier. Additional methods can be used to limit this soda level, for example ATH feed of low total soda may be used and non-sodium based viscosity modifiers can be chosen. However, the low final level of soluble soda achieved by the ion exchange method is in practice largely independent of these additional refinements. Typically the product of the milling process contains in excess of 0.1% soluble soda. The ion exchange treatment after milling can readily reduce the soluble soda content to a value below 0.02% and generally below 0.01%.

After milling, and optionally ion exchange treatment, the suspension can be dried by conventional methods. Spray drying may be used to yield a dry ATH having good powder flow properties, low "dustiness" and a high bulk density.

The particulate ATHs according to the invention have a number of desirable properties. Their small size and narrow size distribution make them very suitable for use as fillers in molded thermoplastic articles, cable sheaths and other plastics articles. When used as fillers they can give the articles concerned better tensile properties than known ATH fillers. It has been fond that the tensile and tear strength obtained can be further improved when a viscosity modifier is added to the suspension during milling. The product when incorporated into polymers shows much less water pick-up from immersion in water or a humid atmosphere than known ATH products and this improvement is especially important when the product is used as a filler for electrical components, as in cable sheaths. It has been fond that the fire resistance of flammable products containing the product of the invention as a flame retardant is greater than for other ATH products at the same weight percent loading.

If desired, the particulate ATH obtained may be coated with a coating agent to modify its properties. For example, the particles may be coated in known manner with a silane-based composition to render them hydrophobic and reduce their tendency to pick up water even further.

The invention will be illustrated by the following Examples.

EXAMPLES

In the following Examples the soluble soda content of ATH is measured by extracting a measured amount of the ATH with a known volume of deionized water, passing the solution so obtained through a flame, and measuring the intensity of the flame coloration obtained at a wavelength characteristic of sodium by means of a spectrophotometer. The value of this intensity is a function of the soluble soda content of the particles.

The average particle size and the polydispersity of the ATH particles are measured by a standard method using a laser photon correlator (supplied by Malvern Instruments Ltd.). In this method a very dilute suspension of the particles in water is formed, a number of pulses of light from a laser are passed through the suspension, a detector placed at an angle to the pulse emitted by the laser detects the light reflected from the particles, and the light received by the detector is analyzed using a digital analyzer to derive a magnitude which is a function of the Brownian motion of the particles, and hence of their mass. The digital analyzer presents the results obtained as (1) the average particle size (that is the diameter of the average particles represented as a sphere) and (2) the polydispersity of the suspension (that is, a measure of the width of the particle size distribution, a higher polydispersity indicating a wider size distribution). The surface area of the particles is measured using the standard Strohlein method.

The water pick-up properties of the ATH filled polymers are measured by an appropriate test method for example that of the UK Naval Engineering Standard NES 518.

Mechanical properties (tear strength, tensile strength and elongation at break) are measured according to International Standards ISO 37 and ISO 34.

Fire retardant properties are measured by recording the critical oxygen index (COI) according to British Standard BS 2782.

EXAMPLE 1

ATH derived from the Bayer process, having an average particle size of about 50 microns and a free soda content in excess of 0.01% by weight is suspended in water to give a suspension of 700 g/l concentration. A sodium polyacrylate viscosity modifier is added to the suspension in an amount of 2.5% by weight of the ATH.

The suspension is milled by passing it through a stirred media mill of known type loaded with ceramic beads, passing the suspension discharged from the mill through a continuous classification device to divide the suspension into a coarser reaction and a finer fraction, recycling the coarser fraction to the mill and recycling the finer fraction to the classification device. Milling with recycling is continued until the desired surface area of the ATH particles is obtained.

After milling the suspension is charged into a vessel containing 10 liters per 100 liters of suspension of Duolite C255H+ ion exchange beads capable of exchanging sodium for hydrogen ions. The suspension is allowed to remain in contact with the beads, with occasional stirring, and the pH of the suspension is monitored using a pH meter. When the pH has fallen to a steady value, below pH 7, the suspension is removed from the beads by filtration and spray dried.

Different batches of ATH are treated in this way, the milling being continued for different periods to produce different average particle sizes. The properties of the products obtained are given in Table 1, with the properties of known ATH powders for comparison. In Table 1 samples A1, A2 and A3 are ATHs according to the invention. Samples B1 and B2 were prepared by the milling method but without continuous classification or ion exchange.

TABLE 1

| Sample | Surface Area (m$^2$/g) | Polydispersity | Soluble Soda Content (% Na$_2$O by wt.) |
|---|---|---|---|
| A1 | 25 | 0.30 | 0.01 |
| A2 | 25 | 0.30 | 0.22 |
| A3 | 45 | 0.34 | 0.02 |
| B1 | 24 | 0.38 | 0.2 |
| B2 | 45 | 0.40 | 0.11 |

The above data demonstrates the combination of reduced soluble soda content and narrower particle size distribution afforded by the process of this invention.

In order to test the mechanical properties of thermoplastics filled with the ATH, a conventional thermoplastic composition prepared from 10% of ethylene-vinyl acetate copolymer, 40% of polyethylene and 50% of ethylene-propylene diene monomer is filled with 150 parts per 100 of ATH, the filled composition is formed into a body and its mechanical properties measured. The results obtained using sample A1 and sample C1, a precipitated ATH of the prior art having a surface area of 7 m$^2$/g are summarized in Table 2.

TABLE 2

| Sample | Tear Strength (KN/m) | Tensile Strength at break (MPa) | Elongation at break (%) |
|---|---|---|---|
| A1 | 19.3 | 3.6 | 140 |
| C1 | 6.7 | 3.3 | 55 |

The fire retardant performances of the composition described above containing samples A1 and C1 are tested according to BS 2782 and the results are as follows

TABLE 3

| Sample | Critical Oxygen Index |
|---|---|
| A1 | 31.8% |
| C1 | 29.3% |

EXAMPLE 2

The process described in Example 1 is used to prepare ATH material of Strohlein surface area 7 m$^2$/g; no viscosity modifier is added. This material, sample D1 is contrasted in Table 4 with material of the prior art, sample C1, described in Example 1.

TABLE 4

| Sample | Surface Area (m$^2$/g) | Soluble Soda (%) |
|---|---|---|
| C1 | 7 | 0.030 |
| D1 | 7 | 0.002 |

What is claimed is:

1. Alumina hydrate particles in dry product form having a surface area from 2 to 15 m$^2$/g, a polydispersity not exceeding 0.3 and a soluble soda content (a sodium content expressed as a weight percent of sodium oxide present which is readily water extractable) not exceeding 0.02%.

2. Alumina hydrate particles according to claim 1, wherein said soluble soda content does not exceed 0.01% by weight.

3. Alumina hydrate particles according to claim 1, wherein said soluble soda content does not exceed 0.005% by weight.

4. Alumina hydrate particles having a surface area above 15 m$^2$/g and a polydispersity not exceeding 0.35%.

5. Alumina hydrate particles according to claim 4, in dry product term having a soluble soda content (a sodium content expressed as a weight percent of sodium oxide present which is readily water extractable) not exceeding 0.02% by weight.

6. Alumina hydrate particles according to claim 4 in dry product form, having a soluble soda content (a sodium content expressed as weight percent of sodium oxide present which is readily water extractable) not exceeding 0.01% by weight.

7. Alumina hydrate particles according to claim 4 in dry product form, having a soluble soda content (a sodium content expressed as a weight percent of sodium oxide present which is readily water extractable) not exceeding 0.005% by weight.

8. Alumina hydrate particles having a surface area of at least 2 m$^2$/g and a polydispersity not exceeding 0.35%, said particles corresponding to particles produced by milling larger particles of alumina hydrate, classifying the milled particles to provide a coarse fraction and a fine fraction, recycling the coarse fraction to said milling, and recycling the fine fraction to said classifying.

9. Alumina hydrate particles according to claim 8 in dry product form, having a soluble soda content (a sodium content as expressed as a weight percent of sodium oxide present which is readily water extractable) not exceeding 0.02% by weight.

10. Alumina hydrate particles according to claim 9, in dry product form wherein said soluble soda content does not exceed 0.01% by weight.

11. Alumina hydrate particles according to claim 9 in dry product form, wherein said soluble soda content does not exceed 0.005% by weight.

* * * * *